United States Patent [19]
Inata et al.

[11] Patent Number: 5,861,932
[45] Date of Patent: Jan. 19, 1999

[54] LIQUID CRYSTAL CELL AND ITS MANUFACTURING METHOD

[75] Inventors: Masashi Inata, Okazaki; Kahoru Mori, Nukata-gun; Katsuhiro Suzuki; Akiji Higuchi, both of Tokyo, all of Japan

[73] Assignees: Denso Corporation, Kariya; Toppan Printing Co., Ltd., Tokyo, both of Japan

[21] Appl. No.: 50,058

[22] Filed: Mar. 30, 1998

[30] Foreign Application Priority Data

Mar. 31, 1997 [JP] Japan .................................. 9-080697

[51] Int. Cl.$^6$ ................................................ G02R 1/1339
[52] U.S. Cl. .............................................................. 349/156
[58] Field of Search ............................................... 349/156

[56] References Cited

U.S. PATENT DOCUMENTS

| | | |
|---|---|---|
| 4,720,173 | 1/1988 | Okada et al. . |
| 5,546,208 | 8/1996 | Shimizu et al. ............. 349/156 |
| 5,559,621 | 9/1996 | Minato et al. . |
| 5,627,665 | 5/1997 | Yamada et al. ............. 349/156 |

FOREIGN PATENT DOCUMENTS

| | | |
|---|---|---|
| 60-131521 | 7/1985 | Japan . |
| 61-235814 | 10/1986 | Japan . |
| 2-223922 | 9/1990 | Japan . |
| 3-2833 | 1/1991 | Japan . |

*Primary Examiner*—William L. Sikes
*Assistant Examiner*—James Dudek
*Attorney, Agent, or Firm*—Pillsbury Madison & Sutro LLP

[57] ABSTRACT

A pair of electrode panels are supported by plural spacer walls made of photo-resist resin to form a cell gap between electrode panels. The cell gap is filled with liquid crystal, preferably, antiferroelectric liquid crystal. The spacer walls are formed on an orientation layer formed on either panel. A thin layer is also formed on the orientation layer together with formation of the spacer walls as a residual layer. The residual layer has to be sufficiently thin not to disturb orientation of the liquid crystal and to attain a sufficiently high display contrast. The thickness of the residual layer is indirectly detected by an X-ray electron spectroscopy for chemical analysis (ESCA), and the residual layer is made sufficiently thin by setting a temperature of a preliminary baking process, which is carried out before formation of the spacer walls, in a proper range.

11 Claims, 5 Drawing Sheets

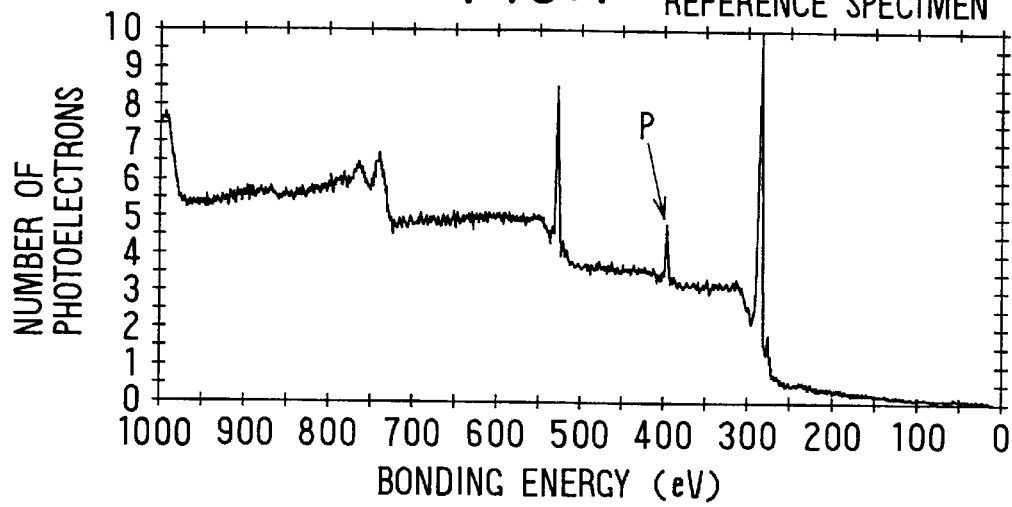
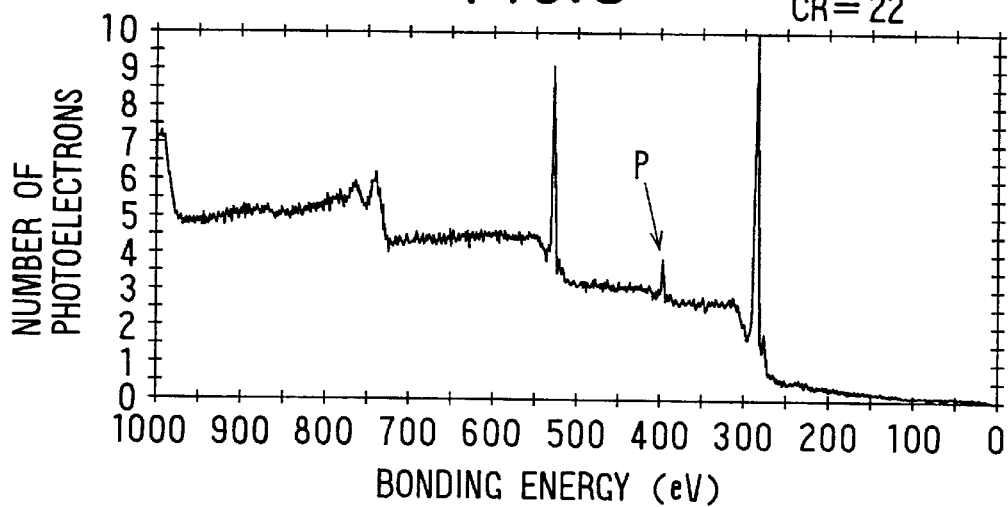
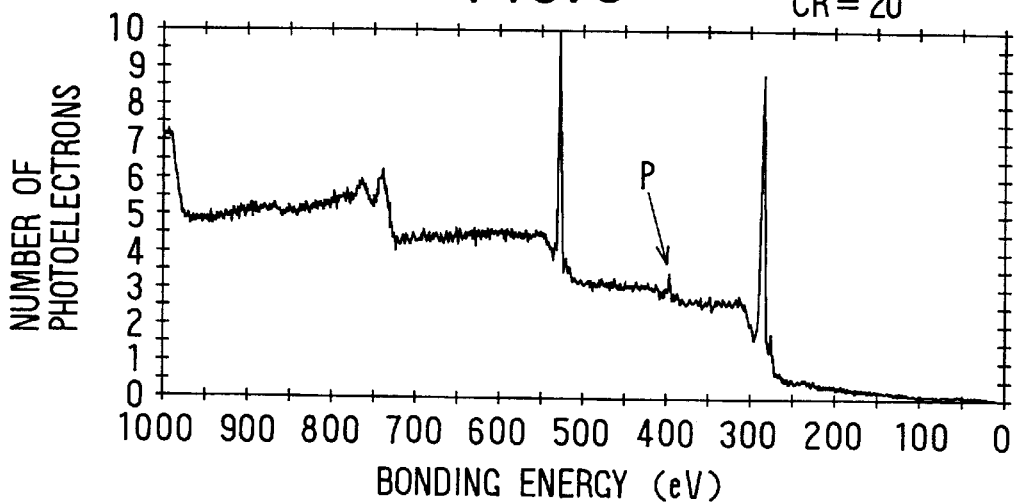

LIQUID CRYSTAL CELL AND ITS MANUFACTURING METHOD

CROSS-REFERENCE TO RELATED APPLICATION

This application is based upon and claims benefit of priority of Japanese Patent Application No. Hei-9-80697 filed on Mar. 31, 1997, the content of which is incorporated herein by reference.

BACKGROUND OF THE INVENTION

1. Field of the Invention

The present invention relates to a liquid crystal cell having spacer walls formed between a pair of electrode panels and a method of manufacturing the same.

2. Description of Related Art

A liquid crystal cell having spacer walls formed between a pair of electrode panels has been known hitherto. The spacer walls serving as spacers for forming a cell gap between a pair of electrode panels and for giving more mechanical strength to the cell are usually made of photosensitive resin called a photo-resist. An example of this kind of cell is disclosed in JP-B2-2-36930, in which chairal liquid crystal is used. The spacer walls are formed on an orientation layer made on one of the electrode panels. A photo-resist layer is coated on the orientation layer and preliminarily baked. Then, a pattern of the spacer walls is formed in a photolithography and developing process. After rubbing the surfaces of the orientation layers on both electrode panels, both panels are overlapped with each other, thereby forming a single cell. Then, the cell is baked while imposing pressure thereon, and finally a space formed in the cell is filled with liquid crystal.

In the developing process, photo-resist layer covering a pixel area other than the spacer walls is intended to be removed completely. However, it is unavoidable that some thickness of the photo-resist layer is left on the area covering the pixels. Such a residual photo-resist layer reduces orientating ability of the orientation layer, and accordingly the liquid crystal in the cell is not properly oriented. This results in a lower display contrast of the liquid crystal cell because luminance of the pixels at a dark mode is increased by the improper orientation of the liquid crystal.

SUMMARY OF THE INVENTION

The present invention has been made in view of the above-mentioned problems, and an object of the present invention is to provide a liquid crystal cell having a thin residual photo-resist layer which does not disturb orientation of liquid crystal. Another object of the present invention is to provide a manufacturing method of a liquid crystal cell in which the residual photo-resist layer is made sufficiently thin not to decrease orientation ability of an orientation layer underneath the residual photo-resist layer.

It is found out that the thickness of the residual photo-resist layer depends on conditions of a preliminary baking process which is performed before a series of steps for forming the spacer walls to evaporate solvent included in the photo-resist layer coated on the orientation layer. When the preliminary baking temperature is high, the residual photo-resist layer becomes thick. On the other hand, a certain level of the baking temperature is necessary to remove solvent from the layer. Therefore, there is a suitable temperature range for the preliminary baking process. Because the residual photo-resist layer is too thin to measure it directly, an electron spectroscopy for chemical analysis (ESCA) is used for measuring its thickness. It is found out that if the thickness of the residual photo-resist layer is smaller than a distance, through which an ESCA peak representing particular atoms in the orientation layer underneath the residual photo-resist layer is detectable, then the residual photo-resist layer does not disturb practically orientation of the liquid crystal, and a sufficient display contrast is attained.

Such a proper thickness of the residual photo-resist layer is achieved when the layer is preliminarily baked at a temperature lower than 90° C. Preferably, it is baked at a temperature in a range from 70° C. to 90° C., considering removal of the solvent contained in the layer.

The thickness of the residual photo-resist layer may be reduced also by radiating ultraviolet light thereon after the spacer walls are formed. When this additional process for reducing the thickness of the residual photo-resist layer is carried out, it is not necessary to control the preliminary baking temperature so strictly.

Other objects and features of the present invention will become more readily apparent from a better understanding of the preferred embodiments described below with reference to the following drawings.

BRIEF DESCRIPTION OF THE DRAWINGS

FIGS. 7 to 10 are ESCA charts showing results of testing residual photo-resist layers of a reference specimen, specimen A1, specimen A2 and specimen A3, respectively;

DETAILED DESCRIPTION OF THE PREFERRED EMBODIMENTS

Figure 1:
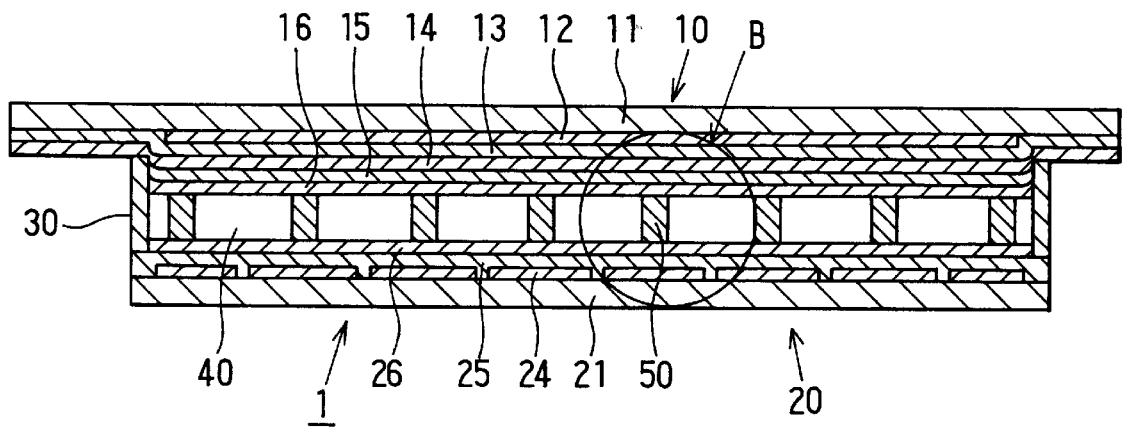
FIG. 1 is a cross-sectional view showing a whole structure of a liquid crystal cell as a first embodiment according to the present invention.
Figure 2:
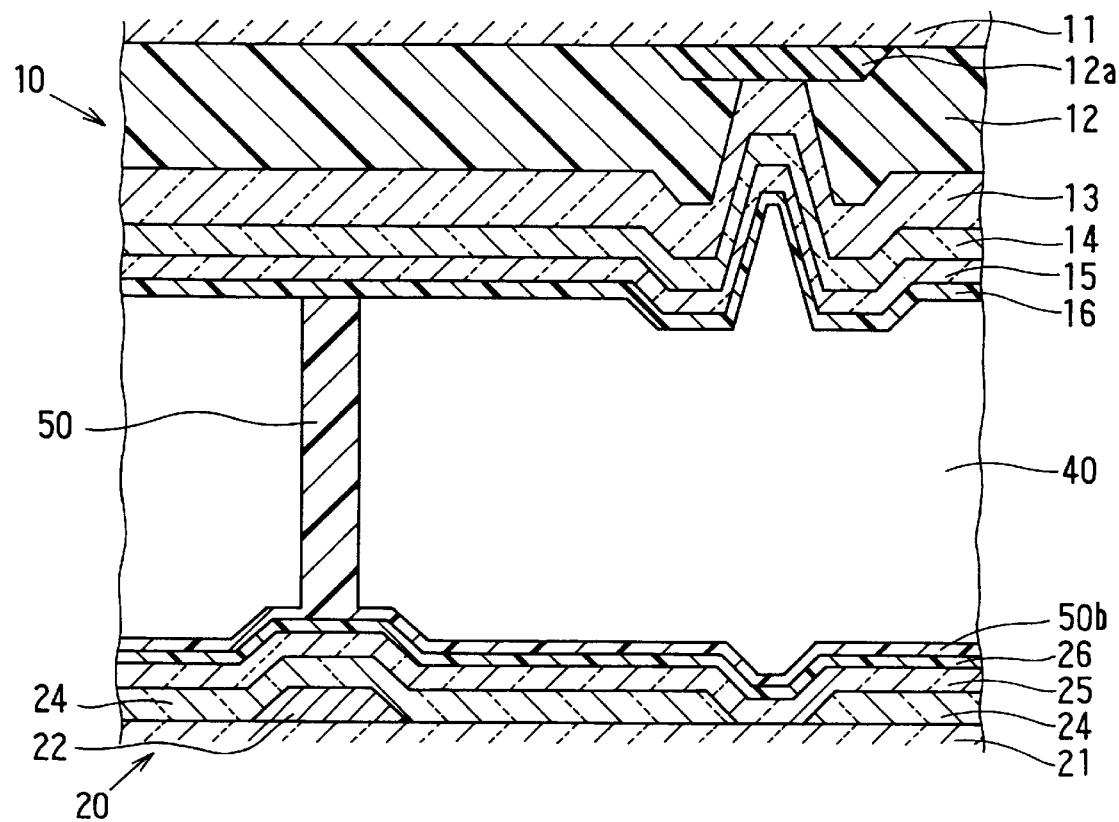
FIG. 2 is a cross-sectional view showing a part B in FIG. 1 in an enlarged scale.

Referring to FIGS. 1 and 2, a structure of a first embodiment according to the present invention will be described. FIG. 1 shows a whole structure of a liquid crystal cell as a first embodiment, and FIG. 2 shows portion B in FIG. 1 in an enlarged scale. Liquid crystal cell 1 is composed of a first electrode panel 10, second electrode panel 20, spacer walls 50 disposed between both panels 10 and 20, and a seal member 30 surrounding a periphery of the cell except an opening for charging liquid crystal. Seal member 30 made of an adhesive material such as thermosetting resin connects both panels 10 and 20 together and seals a space formed between both panels. The space between both panels 10 and 20 is filled with antiferroelectric liquid crystal 40. A distance between both panels (a cell gap) is about 1.5 $\mu$m.

First electrode panel 10 is composed of transparent substrate 11, color filter layer 12, over-coat layer 13, transparent electrode layer 14, insulating layer 15 and orientation layer 16, all of these layers being laminated on transparent substrate 11 in this order. Of all of the layers, color filter layer 12, insulating layer 15 and orientation layer 16 are formed inside seal member 30. Second electrode panel 20 is composed of transparent substrate 21, transparent electrode layer 24, insulating layer 25, orientation layer 26, all of these layers being laminated on transparent substrate 21 in this order. Orientation layer 26 is formed inside sealing member 30. Transparent electrode layer 24 includes a plurality of transparent electrodes each running perpendicularly to a plurality of transparent electrodes of first electrode panel 10. The transparent electrodes of both panels 10 and 20 constitute plural pixels arranged in a matrix in cooperation with a color filter layer 12 and antiferroelectric liquid crystal 40. The pixels except those located on auxiliary electrodes 22 (shown in FIG. 2) function as picture elements to display images on the liquid crystal cell.

Transparent electrodes 14 and 24 are made of a material such as ITO (indium-tin oxide), orientation layers 16 and 26 are made of polyimide resin. Color filter layer 12 includes plural sets of R (red), G (green) and B (blue) elements, each set being arranged in each pixel. As shown in FIG. 2, black mask 12a intercepting luminance is formed between each pixel of color filter 12.

A plurality of spacer walls 50 for making and maintaining the cell gap between first and second electrode panels 10 and 20 are formed on second electrode panel 20 at positions where spacer walls 50 do not interfere with pixels. In this embodiment spacer walls are formed on auxiliary electrodes 22. Residual photo-resist layer 50b having a thickness of about 3 nm covers orientation layer 26. The width of spacer wall 50 is about 10 $\mu$m in this embodiment. Spacer wall 50 may not be made on all of auxiliary electrodes, but may be made on some of them. Spacer wall 50 in this embodiment is made of a photo-resist of acrylic resin, and adheres to both orientation layers 16 and 26. In other words, spacer walls 50 maintain the cell gap of about 1.5 $\mu$m between first and second electrode panels 10 and 20 and enhance the mechanical strength of the liquid crystal cell against vibration and impact.

Referring to FIGS. 3 to 6, the manufacturing processes of the liquid crystal panel will be described. In process S1 shown in FIG. 3, color filter layer 12, over-coat layer 13, transparent electrodes 14, and insulating layer 15 are formed on transparent substrate 11 of first electrode panel 10 in this order. In process S2, orientation layer 16 is formed by off-set printing on the surface of insulating layer 15. In process S3, orientation layer 16 is rubbed in a predetermined direction to give it orientating ability. In process S4, seal member 30 is formed on the periphery of first electrode panel 10. A part of the periphery is left open for charging the liquid crystal in a later process. In process S5, auxiliary electrodes 22, transparent electrodes 24 and insulating layer 25 are formed on transparent substrate 21 in this order. In process S6, orientation layer 26 is formed on insulating layer 25. In process S7, spacer walls 50 are formed on orientation layer 26. Details of this process will be described referring to FIGS. 4 to 6.

Figure 4A:
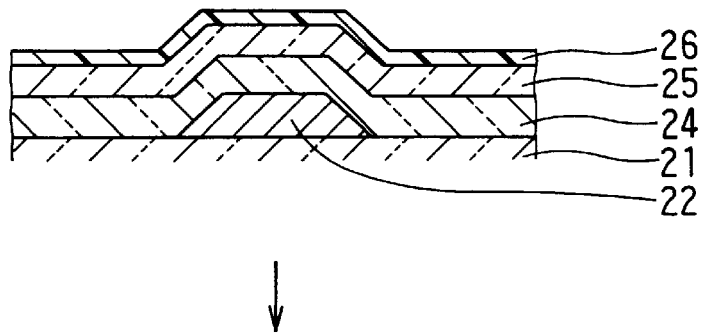
FIG. 4A is a cross-sectional view showing a structure of a second electrode panel before forming a spacer wall.
Figure 4B:
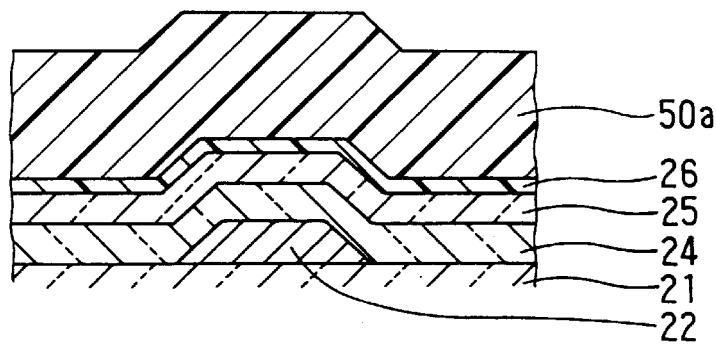
FIG. 4B is a cross-sectional view showing a structure of the second electrode panel after a photo-resist layer is formed in a step S7 of the process chart in FIG. 3.

FIG. 4A shows a part of second electrode panel 20 on which spacer wall 50 is to be formed. 7 cc of photo-resist liquid (a negative type photo-resist of acrylic resin, for example, "CT" made by FUJI-HANT) is dropped on the surface of orientation layer 26 shown in FIG. 4A. Then, second electrode panel 20 is rotated at a speed of 1,300 rpm for 10 seconds, thus, spreading the photo-resist liquid on the surface of orientation layer 26 and forming photo-resist layer 50a as shown in FIG. 4B. Then, the panel is kept at a horizontal level for 5 minutes for leveling the coated photo-resist on the surface. After leveling the photo-resist, the panel is put in a closed vessel and preliminary baking is performed to evaporate solvent contained in photo-resist layer 50a. The preliminary baking is performed at a temperature of 70° to 90° C. for 60 minutes.

Figure 5:
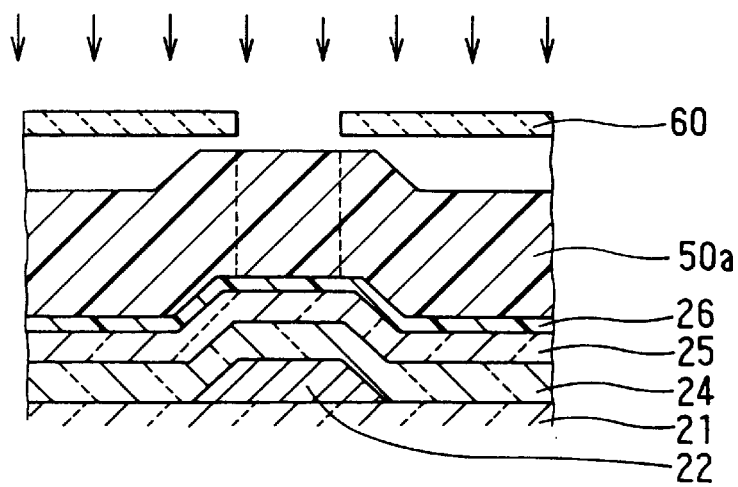
FIG. 5 is a cross-sectional view showing an exposure process of the photo-resist layer.
Figure 6:
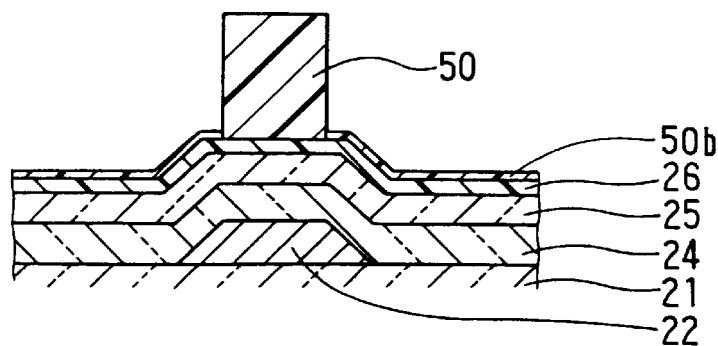
FIG. 6 is a cross-sectional view showing a structure of the second electrode panel after a spacer wall is formed.

Then, as shown in FIG. 5, photo-resist layer 50a is exposed to ultraviolet light through photo-mask 60 which has an opening at a position corresponding to the spacer wall to be formed. The energy of the ultraviolet light is 1,200 mJ/cm$^2$. Thus, the portion of photo-resist layer 50a corresponding to the spacer wall is made insoluble to developing liquid. Then, second electrode panel 20 is dipped in developing liquid (for example, "CD" liquid made by FUJI-HANT) for 60 seconds at a room temperature. After this process, the panel is again dipped in developing liquid in a separate vessel for 60 seconds for performing an additional development. Then, the panel is washed with pure water for 20 minutes and dried by spinning it at a speed of 800 rpm for 8 minutes. Spacer wall 50 made of the photo-resist is thus completed as shown in FIG. 6. Photo-resist layer 50a cannot be completely removed at portions other than spacer wall 50 and remains as residual photo-resist layer 50b covering orientation layer 26 as shown in FIG. 6. Finally, the panel is baked in a high temperature oven at a temperature of 150° C. for 60 minutes to harden spacer wall 50.

Figure 3:
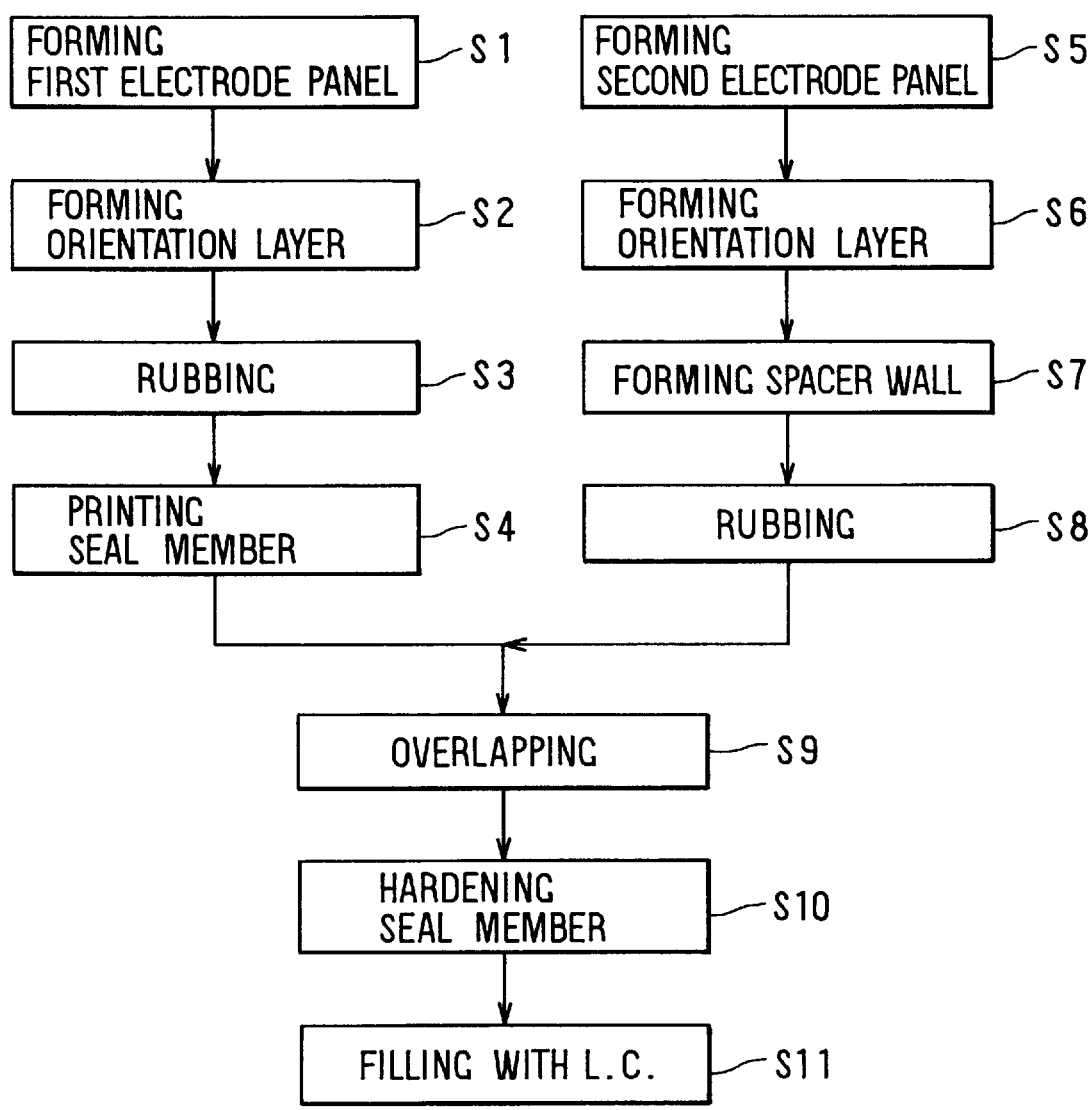
FIG. 3 is a chart showing a manufacturing process of the first embodiment.

Referring again to the process chart in FIG. 3, rubbing is performed on the surface of orientation layer 26 in a predetermined direction to give it orientating ability in process S8. The rubbing may be performed before forming spacer wall 50. However, it is preferable to perform the rubbing after spacer wall 50 is formed because the orientation ability given before process S7 may be decreased by the developing liquid in process S7.

First electrode panel 10 and second electrode panel 20 are overlapped with each other in process S9, so that electrodes 14 and 24 are aligned perpendicularly to each other. Sealing member 30 and spacer walls 50 are interposed between two panels 10 and 20. In process S10, the overlapped panels are baked while applying pressure from outer surfaces of both panels. The pressure applied in this embodiment is 0.4 to 1.0 kg/cm$^2$, and the panels are baked at about 190° C. for 20 minutes. In process S11, the cell gap is filled with antiferroelectric liquid crystal 40 which is sucked into the cell kept in a vacuum through an opening formed at a part of sealing wall 30. Finally, the opening of sealing member 30 is closed by an adhesive such as resin, and the liquid crystal cell is completed.

Now, detailed conditions of the preliminary baking of photo-resist layer 50a in process S7 will be described. In the first embodiment described above, the preliminary baking is performed at a temperature of 70° to 90° C. for 60 minutes. Generally, photo-resist layer 50a becomes harder when it is baked at a higher temperature under a constant baking time. The harder photo-resist layer 50a is, the thicker residual photo-resist layer 50b becomes, because photo-resist layer 50a is less soluble in the developing liquid when it is harder. Because a thicker photo-resist layer deceases more the orientating ability of the orientation layer, resulting in a lower contrast in the display, it is desirable to make residual layer 50b as thin as possible. On the other hand, the solvent contained in the photo-resist layer has to be evaporated sufficiently in the preliminary baking process. Therefore, the temperature in the preliminary baking process has to be properly chosen.

In order to determine a proper range of the preliminary baking temperature, three specimens, each baked at a respective temperature, are made. Specimen A1 is baked at 70° C., specimen A2 at 90° C. and specimen A3 at 110° C. The preliminary baking time of 60 minutes is fixed. The relation between the thickness of the residual photo-resist layer and the display contrast is surveyed. Because the residual photo-resist layer is very thin in a level of several nanometers, it is difficult to measure directly its thickness. Therefore, the thickness is measured indirectly using a method of an X-ray electron spectroscopy for chemical analysis (this method is called ESCA and is in wide use). In ESCA, X-ray is radiated on the surface of a specimen and the number of electrons ejected from the specimen is detected. The kind of atoms contained in a specimen is determined from the energy of electrons ejected, and the amount of atoms is determined from the number of electrons ejected. An ESCA analyzer, "ESCA 5400MC" made by Alvac-Phi is used in this survey.

As specimens, A1, A2 and A3, second electrode panels 20 on which spacer walls 50 and residual photo-resist layer 50b are formed in process S7 as shown in FIG. 6 are used. A specimen is placed in a specimen vacuum chamber of the analyzer having a vacuum of $1.6 \times 10^{-7}$ Pascal, and X-ray generated from an X-ray source of magnesium 15V400W is radiated on the surface of residual photo-resist layer 50b of the specimen. Electrons ejected from the surface of the specimen with an angle of 45-degree are detected. The surface area detected is a round spot having a diameter of 1.1 mm. After the measurement is completed, each specimen is returned to the normal manufacturing process, that is, the specimen is processed in process S8 through S11. The display contrast of each of the completed liquid crystal cell is measured. As a reference specimen, a specimen having no residual photo-resist layer is made and surveyed in the same manner as the specimens A1, A2 and A3.

The results of ESCA analysis are shown in ESCA charts in FIGS. 7 to 10. In the charts, the number of electrons ejected from a specimen is shown on the ordinate, and the bonding energy on the abscissa. FIG. 7 shows the ESCA chart for the reference specimen, FIG. 8 for specimen A1, FIG. 9 for specimen A2 and FIG. 10 for specimen A3, respectively. Because the thickness of a specimen surface which can be detected by ESCA is about 3 nm under the conditions set in this survey, the thickness of residual photo-resist layer 50b can be detected indirectly by detecting atoms contained in orientation layer 26 which is underneath residual photo-resist layer 50b. Orientation layer 26 is made of polyimide resin in which nitrogen atoms are characteristic, and residual photo-resist layer 50b is acrylic resin. Therefore, by detecting the number of nitrogen atoms ejected from orientation layer 26, the thickness of residual photo-resist layer 50b can be indirectly detected.

Figure 10:
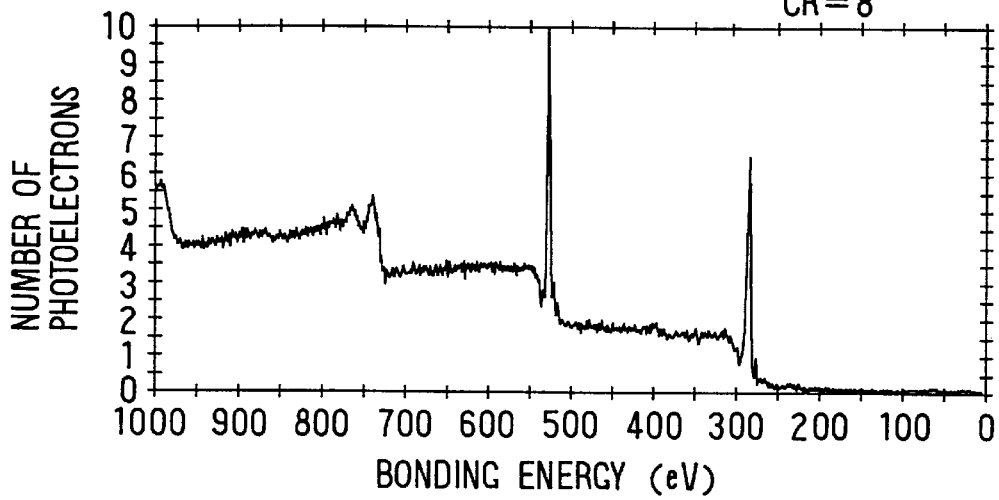

Peak P shown in ESCA charts in FIGS. 7 to 9 represents nitrogen atoms contained in orientation layer 26. Peak P is the highest in FIG. 7 showing the reference specimen which has no residual photo-resist layer, peak P in FIG. 8 showing specimen A1 is the second highest, peak P in FIG. 9 showing specimen A2 is very low and barely detectable, and peak P in FIG. 10 showing specimen A3 is not detectable. This means that the residual layer thickness of specimen A2, the preliminary baking temperature of which is 90° C., is almost equal to the detectable distance by ESCA which is 3 nm. The residual layer thickness of specimen A1 preliminarily baked at a temperature of 70° C. is thinner than that of specimen A2, and the residual layer thickness of specimen A3 preliminarily baked at a temperature of 110° C. is thicker than that of specimen A2.

As shown in each ESCA chart, the display contrast of each specimen is 22 for specimen A1, 20 for specimen A2, and 8 for specimen A3, respectively. The contrast is dependent upon orientating ability of orientation layer 26 which in turn is dependent on the thickness of residual photo-resist layer 50b covering orientation layer 26. Liquid crystal cells having a contrast 20 or 22 are sufficiently good in practical use, but those having a contrast of 8 as specimen A3 are not.

According to the survey described above, a proper range of the preliminary baking temperature is 70° to 90° C. In case a photo-resist solvent which can be purged out at a temperature lower than 70° C. in the preliminary baking process is used, the preliminary baking temperature can be lower than 70° C. Though the preliminary baking of the present embodiment is performed for 60 minutes, the time can be adjusted depending on the baking temperature, as long as the residual photo-resist layer thickness is made in a proper range.

Since the dark mode appears when no voltage is imposed on a pixel in the liquid crystal cell using the antiferroelectric liquid crystal, luminance at the dark mode is heavily dependent on the orientation of the liquid crystal. Therefore, it is especially advantageous to apply the present invention to the antiferroelectric liquid crystal cell. Since the ESCA analysis is carried out before the rubbing process in the manufacturing process of the present invention, the second electrode panel having the residual photo-resist layer thicker than 3 nm can be removed from a manufacturing flow. Therefore, the manufacturing efficiency is enhanced.

Figure 11A:
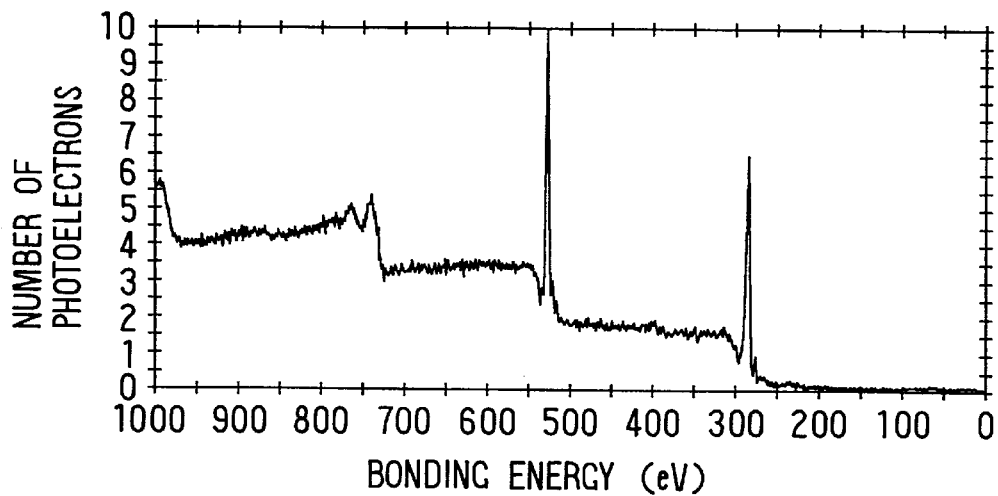
FIG. 11A is an ESCA chart showing a result of testing a photo-resist layer before ultraviolet radiation.
Figure 11B:
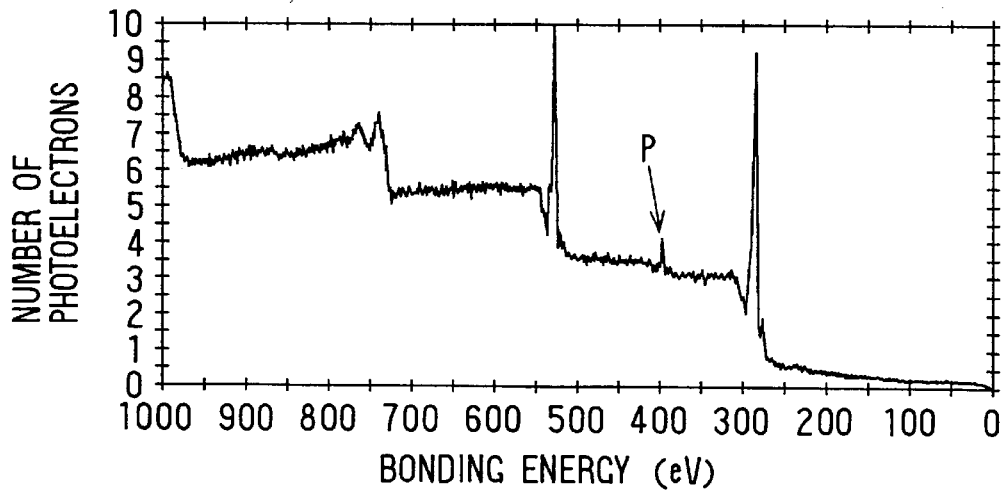
FIG. 11B is an ESCA chart showing a result of testing a photo-resist layer after ultraviolet radiation.

Referring to FIGS. 11A and 11B, a second embodiment according to the present invention will be described. In this embodiment, residual photo-resist layer 50b is removed by radiating ultraviolet light on the surface of the residual layer. After spacer walls 50 is formed in the shape shown in FIG. 6, the ultraviolet light having an energy of 8.6 J/cm$^2$ is radiated on the surface of residual photo-resist layer 50b. Under the ultraviolet radiation, ozone is generated on the surface which in turn decomposes the residual layer and removes the layer from the surface of orientation layer 26. The ultraviolet radiation is performed for 40 minutes. In a test, a specimen which has a thicker residual layer is used.

FIG. 11A is an ESCA chart showing a state before the ultraviolet radiation is performed. FIG. 11B is an ESCA chart showing a state after the ultraviolet light is radiated. The ESCA analysis is carried out in the same manner as in the first embodiment. There is no peak P representing nitrogen contained in orientation layer 26 in FIG. 11A, while peak P is seen in FIG. 11B. This means that residual photo-resist layer 50b is made thinner than 3 nm by the ultraviolet radiation. The ultraviolet radiation is effective in making residual photo-resist layer 50b thinner, and the display contrast is improved by making the residual layer thinner by the ultraviolet radiation.

The present invention described above can also be applied to liquid crystal cells in which liquid crystal other than the antiferroelectric liquid crystal, such as smectic liquid crystal including ferroelectric liquid crystal or nematic liquid crystal, is used. The upper limit of thickness of the residual photo-resist layer which is able to maintain a sufficient contrast is 3 nm in the particular embodiments described above. However, the allowable thickness may be lower than 3 nm when the spacer wall is made of other materials. In this case, whether a panel is rejected or not is judged by comparing a height of peak P of the particular panel in ESCA analysis with peak P corresponding to the allowable thickness. The allowable thickness may be higher than the detectable distance in ESCA analysis (3 nm) depending on the material used. In this case, it is safe to use the detectable distance as a criterion of judgment. It is also possible to adjust the conditions of ESCA analysis to measure the thickness of thinner layers.

For the purpose of judging the residual layer thickness, other methods of analysis such as a photoelectron spectroscopy or an Auger electron spectroscopy may be used.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A liquid crystal cell comprising:
    a first electrode panel including an orientation layer formed thereon;
    a second electrode panel including an orientation layer formed thereon;
    a plurality of spacer walls, formed on an orientation layer of either first or second electrode panel, for supporting both electrode panels so that both orientation layers of the first and the second electrode panels face each other and form a cell gap therebetween;
    a residual layer, made of the same material as the spacer walls and formed together with formation of the spacer walls, covering the orientation layer on which the spacer walls are formed; and
    liquid crystal cell filling the cell gap, wherein
    the thickness of the residual layer is made sufficiently thin not to disturb orientation of the liquid crystal.

2. A liquid crystal cell as in claim 1, wherein the thickness of the residual layer is smaller than a maximum distance within which a specific element contained in the orientation layer is detectable by an X-ray electron spectroscopy for chemical analysis (ESCA).

3. A liquid crystal cell as in claim 2, wherein the specific element is nitrogen.

4. A liquid crystal cell as in claim 1, 2, or 3, wherein the thickness of the residual layer is thinner than 3 nm.

5. A method of manufacturing a liquid crystal cell, the cell including a first electrode panel having an orientation layer formed thereon, a second electrode panel having an orientation layer formed thereon and liquid crystal filling a cell gap between the first and the second electrode panel, the method comprising steps of:
    coating the orientation layer on either first or second electrode panel with a photo-resist resin material;
    preliminarily baking the photo-resist resin material;
    forming a plurality of spacer walls on the orientation layer from the preliminarily baked photo-resist resin material through a process including photolithography;
    overlapping the first and the second electrode panels on each other, so that both orientation layers face each other and the spacer walls support both panels to form a cell gap between the first and the second electrode panels; and
    filling the cell gap with liquid crystal, wherein a residual layer of the same material as the spacer wall covering the orientation layer, formed together with formation of the spacer walls, is made sufficiently thin not to disturb orientation of the liquid crystal.

6. A method of manufacturing a liquid crystal cell, as in claim 5, wherein the photo-resist resin material is an acrylic resin, and the preliminary baking is performed at a temperature lower than 90° C.

7. A method of manufacturing a liquid crystal cell, as in claim 6, wherein the preliminary baking is performed at a temperature higher than 70° C.

8. A method of manufacturing a liquid crystal cell, as in claim 5, wherein the residual layer is processed by radiating ultraviolet light thereon.

9. A method of manufacturing a liquid crystal cell, as in claim 8, wherein a thickness of the residual layer is less than 3 nm.

10. A liquid crystal cell as in claim 1, 2 or 3, wherein the liquid crystal is antiferroelectric liquid crystal.

11. A method of manufacturing a liquid crystal cell as in claim 5, 6, 7, 8 or 9, wherein the liquid crystal filling the cell gap is antiferroelectric liquid crystal.

* * * * *